United States Patent
Pursifull et al.

(10) Patent No.: US 9,273,651 B2
(45) Date of Patent: Mar. 1, 2016

(54) METHOD AND SYSTEM FOR VACUUM GENERATION

(71) Applicant: Ford Global Technologies, LLC, Dearborn, MI (US)

(72) Inventors: Ross Dykstra Pursifull, Dearborn, MI (US); Harbind S. Chahal, Novi, MI (US); Russ William Ferguson, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 29 days.

(21) Appl. No.: 14/080,358

(22) Filed: Nov. 14, 2013

(65) Prior Publication Data

US 2015/0128884 A1 May 14, 2015

(51) Int. Cl.
| | |
|---|---|
| *F02B 37/12* | (2006.01) |
| *F02M 35/00* | (2006.01) |
| *F02M 35/10* | (2006.01) |
| *B60T 13/52* | (2006.01) |
| *B60T 13/57* | (2006.01) |
| *B60T 17/02* | (2006.01) |
| *F02M 35/12* | (2006.01) |
| *F02D 9/02* | (2006.01) |

(52) U.S. Cl.
CPC .......... *F02M 35/10229* (2013.01); *B60T 13/52* (2013.01); *B60T 13/57* (2013.01); *B60T 17/02* (2013.01); *F02M 35/12* (2013.01); *F02M 35/1222* (2013.01); *F02D 2009/024* (2013.01)

(58) Field of Classification Search
CPC ... F02B 37/127; F02B 37/186; F02M 25/089; F02M 25/0836; F02M 35/10229; F02M 35/10209
USPC .................................................. 123/2, 65 WV
See application file for complete search history.

(56) References Cited

U.S. PATENT DOCUMENTS

| | | | |
|---|---|---|---|
| 7,966,996 B1 | 6/2011 | Pursifull | |
| 2008/0264059 A1* | 10/2008 | Hirooka | 60/547.1 |
| 2011/0183812 A1* | 7/2011 | Cunningham et al. | 477/183 |
| 2012/0237366 A1* | 9/2012 | Pursifull | 417/54 |
| 2012/0297765 A1 | 11/2012 | Vigild et al. | |

OTHER PUBLICATIONS

Pursifull, Ross Dykstra et al., "Crankcase Ventilation and Vacuum Generation," U.S. Appl. No. 13/533,871, filed Jun. 26, 2012, 43 pages.
Urley, Joseph Norman et al., "Method and System for Fuel Vapor Management," U.S. Appl. No. 13/660,884, filed Oct. 25, 2012, 35 pages.

(Continued)

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

Methods and systems are provided for reducing the generation and transmission of objectionable noise from an aspirator to a vehicle cabin during vacuum production. During selected conditions, motive flow through an intake aspirator may cause a hissing noise to be produced at the aspirator, and transmitted through an open check valve in a bypass path between the aspirator and a vacuum reservoir, into a vehicle cabin. During these conditions, an aspirator shut-off valve is closed to reduce motive flow through the aspirator, thereby reducing the hissing noise.

18 Claims, 3 Drawing Sheets

(56) References Cited

OTHER PUBLICATIONS

Ulrey, Joseph Norman et al., "Method and System for Vacuum Generation," U.S. Appl. No. 13/670,644, filed Nov. 7, 2012, 37 pages.

Pursifull, Ross Dykstra, "Method and System for Vacuum Generation," U.S. Appl. No. 13/802,020, filed Mar. 13, 2013, 43 pages.

Pursifull, Ross Dykstra, "Systems and Methods for Multiple Aspirators for a Constant Pump Rate," U.S. Appl. No. 13/962,562, filed Aug. 8, 2013, 44 pages.

Pursifull, Ross Dykstra, "Parallel Aspirator Arrangement for Vacuum Generation and Compressor Bypass," U.S. Appl. No. 14/038,497, filed Sep. 25, 2013, 53 pages.

Pursifull, Ross Dykstra et al., "Multiple Tap Aspirator," U.S. Appl. No. 14/062,323, filed Oct. 24, 2013, 42 pages.

Pursifull, Ross Dykstra, "Aspirator Motive Flow Control for Vacuum Generation and Compressor Bypass," U.S. Appl. No. 14/066,569, filed Oct. 29, 2013, 65 pages.

* cited by examiner

METHOD AND SYSTEM FOR VACUUM GENERATION

FIELD

The present invention relates to improving the vacuum generation efficiency of an ejector coupled to an engine system.

BACKGROUND/SUMMARY

Vehicle systems may include various vacuum consumption devices that are actuated using vacuum. These may include, for example, a brake booster. Vacuum used by these devices may be provided by a dedicated vacuum pump. In still other embodiments, one or more aspirators (alternatively referred to as ejectors, venturi pumps, jet pumps, and eductors) may be coupled in the engine system that may harness engine airflow and use it to generate vacuum.

Since aspirators are passive devices, they provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling. While aspirators may generate vacuum at a lower cost and with improved efficiency as compared to electrically-driven or engine-driven vacuum pumps, their use in engine intake systems has traditionally been constrained by both available intake manifold vacuum and maximum throttle bypass flow. Some approaches for addressing this issue involve arranging a valve in series with an aspirator, or incorporating a valve into the structure of an aspirator. Such valves may be referred to as aspirator shut-off valves (ASOVs). An opening amount of the valve is controlled to control the motive air flow rate through the aspirator, and thereby control an amount of vacuum generated at the aspirator. By controlling the opening amount of the valve, the amount of air flowing through the aspirator and the suction air flow rate can be varied, thereby adjusting vacuum generation as engine operating conditions such as intake manifold pressure change.

Vacuum generation at an intake aspirator can also be enhanced by increasing the flow rate through the throat of the aspirator. In one example, this may be achieved by increasing a size (e.g., diameter) of a passage or tube directing airflow into (or out of) the aspirator. However, the inventors have recognized that such adjustments may lead to objectionable noise being transmitted to the vehicle cabin. For example, tubes leading into or out of the intake aspirator may cause a loud hissing noise to be conducted from the aspirator into the brake booster and thereon into the vehicle cabin. The noise is generated due to sonic flow of air in the aspirator throat becoming supersonic in the entrainment zone and diverging cone of the aspirator. When the supersonic flow collapses to a subsonic flow, a hissing noise is created. The noise may be objectionable to the vehicle operator and may degrade their drive experience.

The above issues may be addressed by a method of operating a valved intake aspirator that enhances vacuum generation while reducing objectionable noise production. One example method includes: closing a first valve coupled between a vacuum reservoir and an intake manifold, upstream of an aspirator, responsive to opening of a second valve coupled between the vacuum reservoir and the intake manifold. Herein, the first valve controls motive flow through the aspirator into a low pressure sink, in this case, the intake manifold. In this way, motive flow through the aspirator is disabled during conditions when hissing sound may be transmitted through the first valve when it is in the open position. In other words, the ASOV is commanded closed while conditions are such that the bypass valve is inferred to be open. The bypass valve is typically a check valve.

As an example, an engine system may be configured with an aspirator coupled across an intake throttle in a first intake bypass passage. The intake bypass passage may be configured to route a portion of intake air from upstream of an intake compressor to downstream of the intake throttle. A solenoid-operated aspirator shut-off valve (ASOV) may be coupled upstream of the aspirator in the intake bypass passage to vary a motive flow through the aspirator. An opening or closing of the vacuum solenoid may be adjusted by an engine controller based on various engine operating conditions such as manifold pressure, boost pressure, brake booster vacuum level, engine vacuum demand, etc. The aspirator throat may be coupled to a vacuum consumer, such as a brake booster, so that vacuum generated at the aspirator can be used for meeting brake vacuum demand. A further bypass passage may couple the brake booster to the intake manifold at a location downstream of the aspirator outlet. A check valve in the bypass passage may open during selected conditions, such as when intake manifold vacuum is deeper than brake booster vacuum, to substantially equalize brake booster vacuum with intake manifold vacuum.

The inventors have recognized that an objectionable hissing noise may be generated at the aspirator throat and transmitted downstream of the point when flow occurs (i.e. when the ASOV is open). This noise is transmitted through the open bypass check valve through a conduit to the brake booster. The noise cannot be transmitted upstream to the vehicle cabin through the aspirator throat due to sonic conditions at the throat. Therefore, during conditions when vacuum is demanded, ASOV opening is delayed until bypass check valve closure is inferred. An engine controller may infer an open or closed state of the bypass check valve based on an intake manifold vacuum (as estimated by a manifold pressure sensor) relative to a brake booster vacuum (as estimated by a brake booster pressure sensor). In response to the vacuum demand, the controller may first allow a vacuum to be drawn at the brake booster from the intake manifold via the bypass check valve with the ASOV closed. Upon inferring that the bypass check valve is closed, the ASOV may be opened, motive flow may be directed through the aspirator, and vacuum may be drawn into the brake booster from the aspirator throat.

In this way, by closing an ASOV during conditions when a bypass check valve is open, the transmission of the hissing noise associated with vacuum production at the aspirator during those conditions is reduced. By delaying motive flow through the aspirator until the bypass check valve is closed, generation and transmission of objectionable noise resulting from aspirator vacuum production is decreased. Overall, the aspirator is able to meet the brake vacuum demand at a lower cost and with improved efficiency without degrading the vehicle operator's drive experience.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
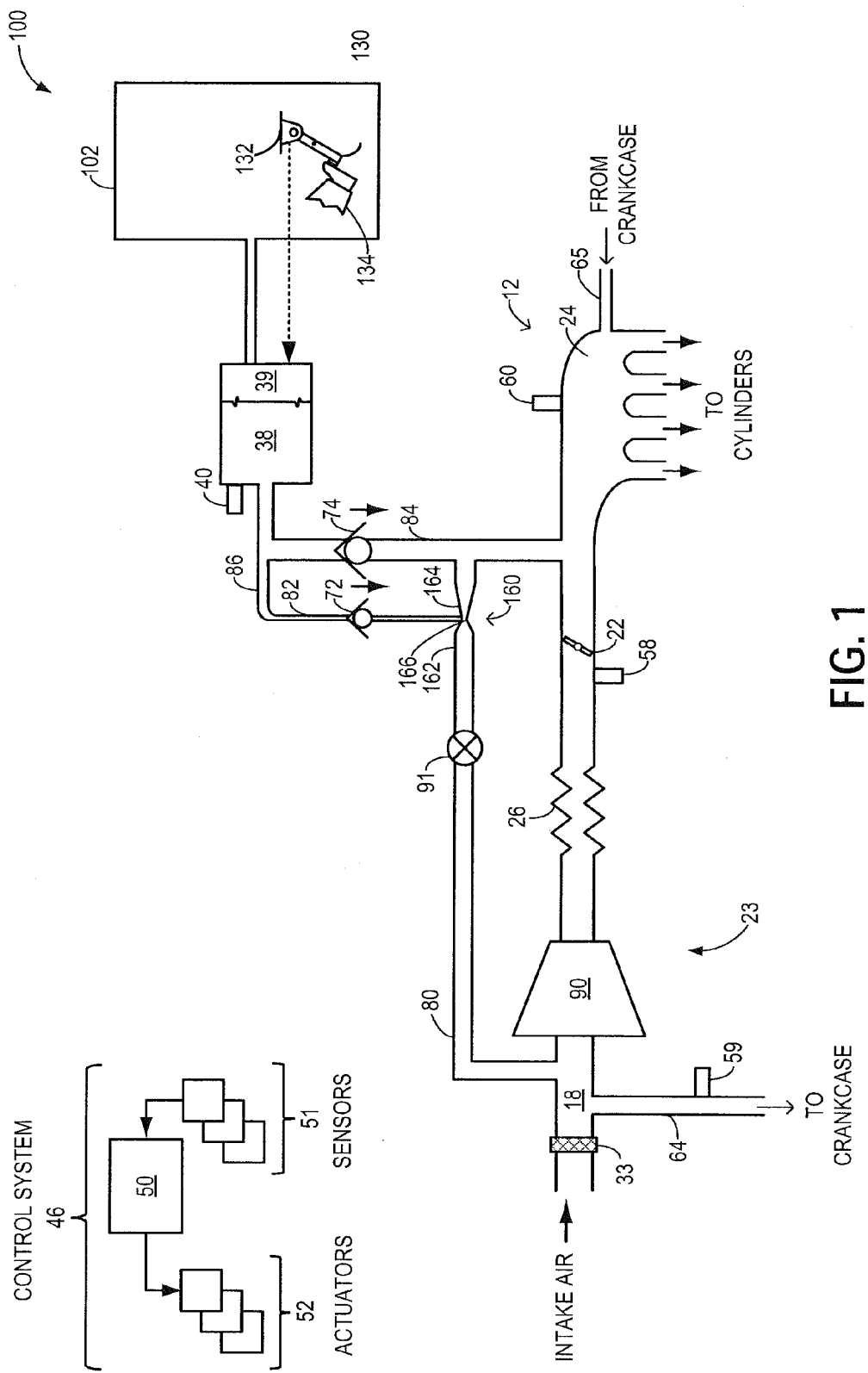
FIG. 1 shows a schematic depiction of an engine system including a valved aspirator.

Methods and systems are provided for generating vacuum at an intake aspirator coupled to an engine system, such as the engine system of FIG. 1. An opening of a motive flow control valve coupled upstream of the aspirator may be adjusted based the open or closed state of a check valve coupled in a bypass downstream of the aspirator. A controller may be configured to perform a control routine, such as the example routine of FIG. 2, to close an aspirator shut off valve during conditions when the check valve is open so as to reduce the generation and transmission of objectionable noise, associated with aspirator vacuum production, into the vehicle cabin. Example valve adjustments are described with reference to FIG. 3.

Turning to FIG. 1, it shows an example engine system 100 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 has an engine intake 23 that includes an air intake throttle 22 fluidly coupled to an engine intake manifold 24 along an intake passage 18. Air may enter intake passage 18 from an air intake system (AIS) including an air cleaner 33 in communication with the vehicle's environment. A position of intake throttle 22 may be varied by a controller 50 via a signal provided to an electric motor or actuator included with the throttle 22, a configuration that is commonly referred to as electronic throttle control (ETC). In this manner, the throttle 22 may be operated to vary the intake air provided to the intake manifold and the plurality of engine cylinders. The intake 23 may include mass air flow sensor 58 and a manifold air pressure sensor 60 for providing respective signals MAF and MAP to controller 50.

In some embodiments, engine system 10 is a boosted engine system, where the engine system further includes a boosting device. In the present example, intake passage 18 includes a compressor 90 for boosting an intake aircharge received along intake passage 18. A charge air cooler 26 (or intercooler) is coupled downstream of compressor 90 for cooling the boosted aircharge before delivery to the intake manifold. In embodiments where the boosting device is a turbocharger, compressor 90 may be coupled to, and driven by an exhaust turbine (not shown). Further compressor 90 may be, at least in part, driven by an electric motor or the engine crankshaft.

In some embodiments, a compressor bypass passage (not shown) may be coupled across compressor 90 so as to divert at least a portion of intake air compressed by compressor 90 back upstream of the compressor. When included, an amount of air diverted through the compressor bypass passage may be controlled by opening a compressor bypass valve (CBV) located in the bypass passage. By controlling the CBV to vary an amount of boosted air recirculated from downstream of the compressor to upstream of the compressor, boost and surge control is enabled.

In some embodiments, engine system 10 may include a positive crankcase ventilation (PCV) system (not shown) that is coupled to the engine intake so that gases in the crankcase may be vented in a controlled manner from the crankcase. Therein, during non-boosted conditions (when manifold pressure (MAP) is less than barometric pressure (BP)), air is drawn into the crankcase via a breather or vent tube 64. Crankcase ventilation tube 64 may be coupled to fresh air intake passage 18 upstream of compressor 90. In some examples, the crankcase ventilation tube 64 may be coupled downstream of air cleaner 33 (as shown). In other examples, the crankcase ventilation tube may be coupled to intake passage 18 upstream of air cleaner 33. A pressure sensor 59 may be coupled in the crankcase vent tube 64 to provide an estimate of the crankcase vent tube pressure and the compressor inlet pressure. Crankcase gases may then delivered to intake manifold 24 along crankcase passage 65.

A conduit 80 (herein also referred to bypass air intake passage 80), positioned parallel to air intake passage 18, may be configured to divert a portion of the intake air received from downstream of the air cleaner 33 and upstream of the compressor 90 to intake manifold 24 via an aspirator 160. Aspirator 160 may be an aspirator, ejector, eductor, venturi, jet pump, or similar passive device. In the present example, the aspirator is a three port device including a motive inlet 162, a mixed flow outlet 164, and a throat (or entraining inlet) 166. Aspirator 160 has an upstream motive flow inlet 162 via which air enters the aspirator. Aspirator 160 further includes a throat 166 or entraining inlet communicating with a vacuum reservoir 38 along a first passage 82. Air flowing through the motive inlet 162 may be converted to flow energy in the aspirator 160, thereby creating a low pressure communicated to the throat 166 and drawing a vacuum at the throat. Vacuum drawn at the throat 166 of aspirator 160 is directed to vacuum reservoir 38 through first check valve 72 located in first passage 82. The first check valve 72 allows vacuum reservoir 38 to retain any of its vacuum should the pressures in the aspirator's motive inlet and the vacuum reservoir equalize. While the depicted embodiment shows first check valve 72 as a distinct valve, in alternate embodiments of the aspirator, check valve 72 may be integrated into the aspirator.

Aspirator 160 further includes a downstream mixed flow outlet 164 via which air that has passed through aspirator 160 can exit and be directed to intake manifold 24. As such, intake manifold 24 is also coupled to vacuum reservoir 38 along second passage 84. Second check valve 74 in second passage 84 allows vacuum generated at the intake manifold to be directed to vacuum reservoir 38 while bypassing the aspirator but does not allow air flow from the intake manifold into the vacuum reservoir. Also, during conditions when air pressure in the intake manifold is higher, check valve 74 does not allow air to flow back through the ejector and into conduit 80, from where the air may be directed back to the intake passage, upstream of compressor 90. Since the vacuum reservoir 38 can receive vacuum directly from intake manifold 24, second check valve 74 allows vacuum to be drawn into the vacuum reservoir 38 from intake manifold 24 during conditions when the intake manifold vacuum is deeper than the vacuum reservoir vacuum level. In addition, second check valve 74 allows vacuum reservoir 38 to retain any of its vacuum should the pressure in the intake manifold 24 and the vacuum reservoir equalize. In some embodiments, second passage 84 and check valve 74 may constitute (and be referred to as) a bypass path, providing a high flow rate path for air from the vacuum reservoir to the intake manifold while bypassing aspirator 160. This flow path dominates while reservoir pressure is above manifold pressure. As such, the high pressure point in the depicted system (compressor inlet) may always connect to the aspirator inlet and the aspirator outlet point may be routed to the low pressure point (intake manifold). In an alternate embodiment, the aspirator outlet may be routed to the lowest pressure point via check valves. Each of the first and second passages merge at third passage 86, downstream (in the direction of flow) of an outlet of vacuum reservoir 38.

In some examples, aspirator 160 may operate passively, e.g., where motive flow passing through aspirator 160 depends upon pressures within engine system 10 and other engine operating parameters without any active control performed by the control system. However, in the embodiment of FIG. 1, an aspirator shut-off valve (ASOV) 91 is actively controlled to allow/disallow motive flow through the aspirator (in the case of a binary ASOV) or to reduce/increase flow through the aspirator (in the case of a continuously variable ASOV). Thus, by adjusting an opening of ASOV 91, a motive flow through aspirator 160 can be varied, and an amount of vacuum drawn at aspirator throat 166 can be modulated to meet engine vacuum requirements.

As shown, ASOV 91 is arranged in bypass intake air passage 80 upstream of the throat of aspirator 160. In other embodiments, the ASOV may be arranged downstream of the throat of the aspirator (e.g., in the exit tube or downstream of the exit tube), or the ASOV may be integral to the aspirator (e.g., the valve may be arranged at the throat of the aspirator). One advantage of positioning the ASOV upstream of the aspirator is that the pressure loss associated with the ASOV has less of an impact as compared to configurations where the ASOV is downstream of the aspirator throat or where the ASOV is integral to the aspirator.

ASOV 91 may be a solenoid valve which is actuated electrically, and its state may be controlled by controller 50 based on various engine operating conditions. However, as an alternative, the ASOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

Whether it is actuated electrically or with vacuum, ASOV 91 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ASOV may provide greater flexibility in control of the motive flow through the aspirator, with the drawback that continuously variable valves may be much more costly than binary valves. In still other examples, ASOV 91 may be a gate valve, pivoting plate valve, poppet valve, or another suitable type of valve.

The state of ASOV 91 (e.g., open or closed) may be determined based on various engine operating conditions. In one example, the state of ASOV 91 is determined based on vacuum level in vacuum reservoir 38, the ASOV opening increased as the vacuum level falls (e.g., below a threshold vacuum level) to increase vacuum production at the aspirator. The ASOV opening may then be decreased when the vacuum level in the reservoir rises above the threshold. As another example, the state of ASOV 91 may be determined based on boost pressure.

By controlling the solenoid of ASOV 91 to control the ASOV, controller 50 may have near full control over the ASOV, thereby controlling the aspirator's motive flow. In particular, ASOV 91 may be controlled to provide a high motive flow rate aspirator without degrading the intake throttle's ability to establish very low air flow rates during warm idle conditions with minimal alternator or air condition compressor loads. As such, the engine has a very low air flow rate requirement when the engine is up to operating temperature, the Front End Accessory Drive (FEAD) loads are low, and the torque converter loads are low. By opening the ASOV on an on-demand basis, conditions where the ejector motive flow can cause air flow greater than desired are reduced (e.g., minimized). Since air flow rate greater than desired leads to extra fuel being injected, by reducing the likelihood of air flow disturbances, engine performance and fuel economy is improved.

Vacuum reservoir 38 may be coupled to one or more engine vacuum consumption devices 39. For example, vacuum consumption device 39 may be a brake booster coupled to vehicle wheel brakes in a vehicle cabin 102 wherein vacuum reservoir 38 is a vacuum cavity in front of a diaphragm of the brake booster. Therein, vacuum reservoir 38 may be an internal vacuum reservoir configured to amplify a force provided by a vehicle operator 130 via a brake pedal 134 for applying vehicle wheel brakes (not shown). A position of the brake pedal 134 may be monitored by a brake pedal sensor 132. It will be appreciated that while the depicted embodiments are described using a brake booster as the vacuum consumer, in alternate embodiments, an alternate engine vacuum consumer may be substituted. For example, the vacuum reservoir may be coupled to one or more of a brake booster, a purge canister, a charge motion control valve, crankcase ventilation, and a turbine wastegate. Further still, any vacuum reservoir may be substituted. In some embodiments, as depicted, a vacuum sensor 40 (or pressure sensor) may be coupled to the vacuum reservoir 38 for providing an estimate about the vacuum level at the reservoir.

Check valves in each of the first and second passages control flow direction to/from the reservoir. The second passage 84 further couples the vacuum reservoir 38 to the engine intake manifold 24 downstream (in the direction of flow) of a juncture with the aspirator outlet.

In some embodiments, during vacuum generation at aspirator 160, a hissing noise is generated at the aspirator which is then transmitted to vehicle cabin 102 via vacuum reservoir 38 and vacuum consumption device 39. The hissing noise may be objectionable to the vehicle operator and may degrade their drive experience. The hissing noise may be exacerbated in embodiments where vacuum generation at intake aspirator 160 is enhanced by increasing a flow rate across the throat of the aspirator via adjustments to the size of tubes or passages leading into and out of aspirator 160. For example, hissing may be louder in embodiments where the diameter of the aspirator throat is increased (e.g., to 4 mm diameter). As such, the noise is generated due to sonic flow of air in the aspirator throat becoming supersonic in the throat 166 and outlet 164 of the aspirator. When the supersonic flow collapses to a subsonic flow, a hissing noise is created. The noise cannot be transmitted upstream through the throat to the vehicle cabin due to the sonic velocities. The noise is also unlikely to be transmitted via the suction port at the throat also due to the sonic velocities. Therefore, the sound is likely to propagate out of the diverging cone (or mixed flow outlet) of the aspirator. In other words, during conditions when second check valve 74 is open, the sound travels to the vacuum reservoir and vacuum consumption device (e.g., to a brake booster) and is then transmitted to the vehicle cabin. As elaborated at FIG. 2, during vacuum demand, controller 50 may adjust an opening of ASOV 91 based on a state of second check valve 74. Specifically, in response to a demand for vacuum generation at aspirator 160, the opening of ASOV 91 may be delayed until closure of second check valve 74 is confirmed so as to reduce the generation and transmission of objectionable noise into the vehicle cabin.

Returning to FIG. 1, engine system 10 may also include a control system 46 including a controller 50, sensors 51 and actuators 52. Example sensors include mass air flow sensor 58, manifold air pressure sensor 60, crankcase vent tube pressure sensor 59, and vacuum sensor 40. Example actuators include engine valves, intake throttle 22, and ASOV 91. Controller 50 may further include a physical non-transitory memory with instructions, programs and/or code for operating the engine. An example routine executed by controller 50 is shown at FIG. 2.

Figure 2:
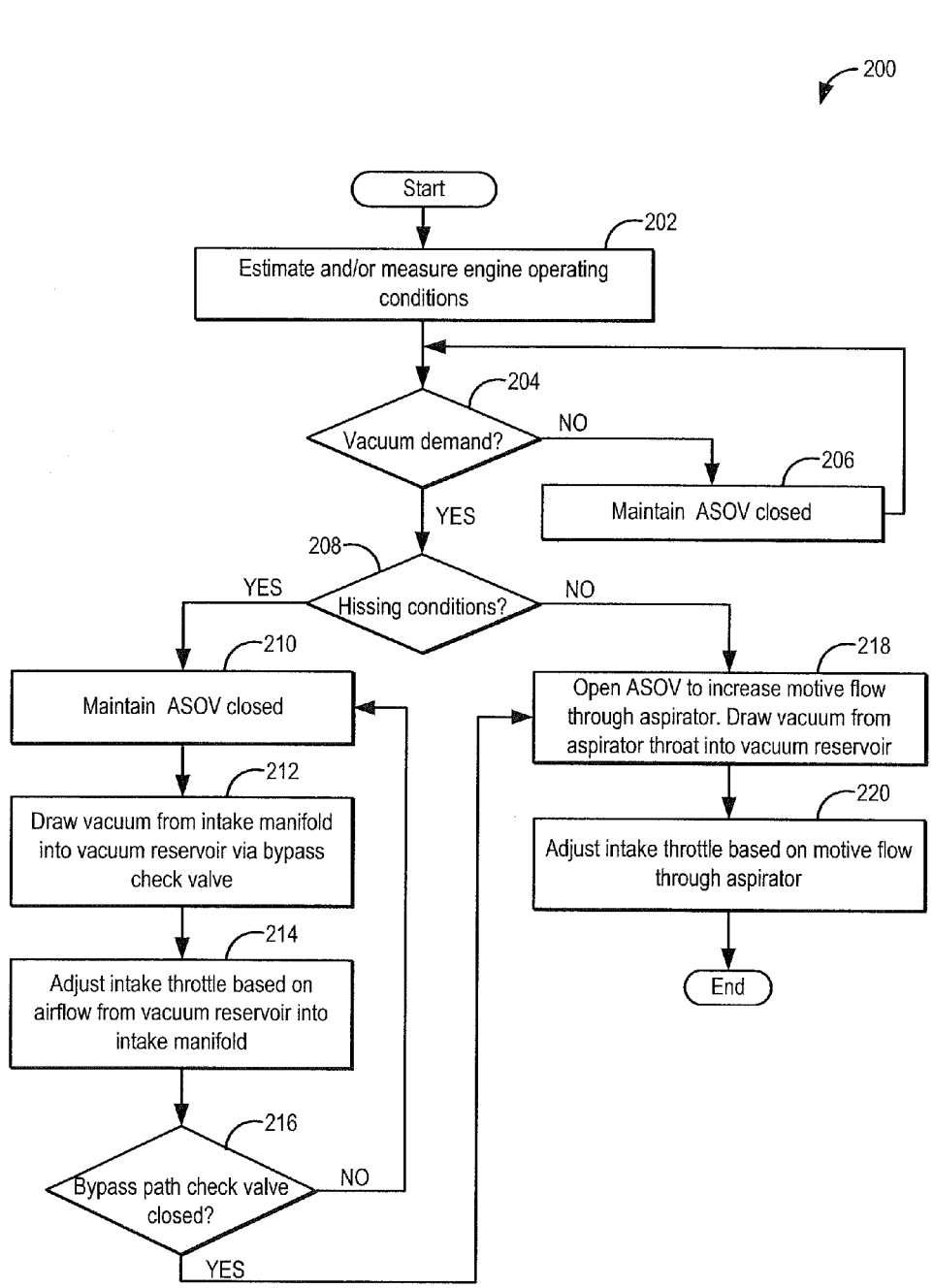
FIG. 2 shows a high level flow chart illustrating a routine that may be implemented for controlling the operation of an aspirator shut off valve to reduce transmission of objectionable noise to the vehicle cabin.

Now turning to FIG. 2, an example routine 200 is shown for operating an aspirator shut off valve (ASOV) coupled upstream of (or integral to) an intake aspirator. The routine enables motive flow through the aspirator to be adjusted based on engine vacuum needs while reducing the transmission of objectionable noises, generated due to the motive flow, into the vehicle cabin.

At 202, the routine includes estimating and/or measuring engine operating conditions. These include, for example, engine speed, engine temperature, atmospheric conditions (temperature, BP, humidity, etc.), boost level, desired torque, EGR, etc.

At 204, it may be determined if there is a vacuum demand. Specifically, it may be determined if vacuum generation is required. In one example, based on the estimated engine operating conditions, a vacuum level required to meet the engine vacuum demand is determined. Therein, the vacuum level required to operate one or more engine vacuum consumption devices may be determined. For example, a vacuum level required to provide a brake assist via a brake booster may be determined. As another example, a vacuum level required to actuate a wastegate for boost control may be determined. As still another example, a vacuum level required to fully purge a fuel system canister may be determined. As yet another example, a vacuum level required to actuate a CMCV may be determined. It may be then be determined if there is insufficient vacuum in an engine vacuum reservoir to meet the vacuum demand and if further vacuum generation is required. For example, it may be determined if the vacuum level in a vacuum reservoir coupled to the engine vacuum consumption device is sufficient to meet the vacuum requirement of the vacuum consumption device. This includes determining if there is sufficient vacuum in a brake booster vacuum reservoir for providing brake assist, if there is sufficient vacuum in a waste gate vacuum reservoir for actuating the turbine wastegate, if there is sufficient vacuum in a vacuum reservoir coupled to a CMCV for actuating the CMCV, etc. Similarly, the vacuum level at various other engine vacuum consumers may be estimated. Further still, in embodiments where the engine includes a common vacuum reservoir, the vacuum level of the common vacuum reservoir may be assessed relative to the vacuum demand to determine if further vacuum generation is required. As such, if there is not enough vacuum in the reservoir to meet the vacuum demand, it may be confirmed that additional vacuum generation is required.

While the routine suggests determining if there is sufficient vacuum in the vacuum reservoir to meet the engine vacuum demand, in still other examples, an amount of intake manifold vacuum that is available under the prevalent operating conditions may also be estimated. Therein, it may be determined if there is sufficient vacuum in the vacuum reservoir to supplement the intake manifold vacuum in meeting the vacuum demand of the various vacuum consumers.

If vacuum generation is not required, at 206, the routine includes closing the ASOV (if it was already open) or maintaining the ASOV closed (if it was already closed) so as to decrease motive flow through the aspirator. As such, the ASOV may be a solenoid-controlled two port valve. Closing the valve may include fully closing the valve or moving the valve to a more closed position. As a result of the reduced motive flow, less vacuum may be drawn at the aspirator. Closing the ASOV may include the controller actuating the ASOV solenoid in a closing direction. In this way, during high vacuum conditions, when vacuum does not need to be replenished, the ASOV can be closed to decrease vacuum generation at the aspirator.

If there is insufficient vacuum in the vacuum reservoir and further vacuum generation is required, then at 208, it may be determined is hissing conditions are present. Specifically, it may be determined if an objectionable hissing noise is likely to be generated and transmitted during vacuum production at an intake aspirator. As discussed with reference to FIG. 1, an objectionable hissing noise may be transmitted into the vehicle cabin from the intake aspirator during conditions when a bypass check valve (such as second check valve 74 of FIG. 1) is open. The bypass check valve may be a mechanical valve coupled between the vacuum reservoir and the intake manifold, downstream of the intake aspirator which allows flow in a single direction. An indication regarding the open or closed state of the bypass check valve may be inferred based on intake manifold vacuum relative to a vacuum level of the vacuum reservoir (e.g., the brake booster vacuum). For example, intake manifold vacuum may be estimated by a manifold pressure sensor (such as MAP sensor 60 of FIG. 1) while the vacuum reservoir vacuum level is estimated by a pressure sensor coupled to the reservoir, such as a brake booster vacuum sensor (for example, vacuum sensor 40 of FIG. 1). Herein, the indication is based on the output of multiple sensors. The controller may indicate that the bypass check valve is open when the intake manifold vacuum is deeper than the vacuum reservoir vacuum level (e.g., when the intake manifold vacuum exceeds the vacuum reservoir vacuum level by more than a threshold amount). In alternate embodiments, the indication may be based on a rate of vacuum generation at the vacuum reservoir, such as based on the output of vacuum sensor 40 only. Herein, the indication is based on the output of a single sensor, providing component reduction benefits in cost and complexity. The controller may indicate that the bypass check valve is open when the rate of vacuum generation at the vacuum reservoir (with an ASOV open) is higher than a threshold, the threshold based on a rate of vacuum generation at the aspirator. For example, if the rate of vacuum drawn in the brake booster is faster than the rate of vacuum generation at the aspirator, it may be inferred that the bypass check valve is open.

It will be appreciated that in embodiments where the indication of hissing conditions (and the bypass check valve being open) is based on the output of each of the intake manifold sensor (e.g., MAP sensor 60 of FIG. 1) and the brake booster sensor (e.g., vacuum sensor 40 of FIG. 1), both sensors may be the same type of pressure sensor. For example, both sensors may be absolute, differential, or gauge sensors. If they are of two different types, for example if one is a gauge sensor and the other is an absolute pressure sensor, their outputs may need to be related by barometric pressure, inferred or measured. For example, barometric pressure may need to be added to the output of a gauge pressure sensor to generate an absolute pressure output that can then be compared to the output of the absolute pressure sensor. As another example, barometric pressure may need to be subtracted from the output of an absolute pressure sensor to generate a gauge pressure output that can be compared to the output of a gauge pressure sensor.

If the bypass valve is closed, hissing conditions may not be confirmed, and the routine proceeds to 218 to open the ASOV responsive to the vacuum demand to increase motive flow through the aspirator. As a result of the increased motive flow, more vacuum may be drawn at the aspirator. A throat of the aspirator may be coupled to the vacuum reservoir via the vacuum consumption device so that the vacuum generated at the aspirator via the motive flow is drawn into the vacuum reservoir. Opening the ASOV may include the controller actuating the solenoid in an opening direction. Opening the valve may include fully opening the valve or moving the valve to a more open position. In this way, during low vacuum conditions, when vacuum needs to be replenished, the ASOV can be opened to increase vacuum generation at the aspirator.

The routine may then move to 220 wherein while opening the ASOV, the intake throttle position is adjusted to reduce air-flow disturbances and maintain air flow conditions. Specifically, an opening of the intake throttle is adjusted based on motive flow through the aspirator. The controller may reduce an opening of the intake throttle as motive flow through the aspirator is increased. The vacuum generated at the aspirator may then be used to actuate and operate the vacuum consumption device(s) coupled to the vacuum reservoir.

Returning to 208, if it is determined that the bypass check valve is open and hissing conditions are present (that is, hissing is likely to occur due to motive flow through the aspirator), then at 210, the routine includes closing the aspirator shut off valve coupled between the vacuum reservoir and the intake manifold, upstream of the aspirator responsive to opening of the bypass check valve coupled between the vacuum reservoir and the intake manifold, downstream of the aspirator. Herein, the ASOV is maintained closed (if already closed), or shifted to a closed position (if already open) even though vacuum is demanded. At 212, the routine includes drawing vacuum from the intake manifold directly into the vacuum reservoir via the bypass check valve, while bypassing the aspirator (that is, without any motive flow through the aspirator). As such, vacuum may continue to be drawn into the vacuum reservoir from the intake manifold via the bypass check valve until vacuum levels substantially equilibrate between the vacuum reservoir and the intake manifold (e.g., until a difference between the intake manifold vacuum and a brake booster vacuum is less than a threshold amount). At 214, an intake throttle opening is adjusted based on airflow from the vacuum reservoir into the intake manifold to reduce air-flow disturbances and maintain air flow conditions. Specifically, an opening of the intake throttle may be decreased as air flow from the vacuum reservoir into the intake manifold increases. The vacuum drawn at the aspirator may be concurrently used to actuate and operate the vacuum consumption device(s) coupled to the vacuum reservoir.

At 216, it may be confirmed that the bypass check valve is closed. As such, the bypass check valve may automatically close when the vacuum reservoir vacuum has equilibrated with the intake manifold vacuum. As discussed at 208, an indication regarding the closing of the bypass check valve may be based on a comparison of intake manifold vacuum relative to vacuum reservoir vacuum level (such as when they are within a threshold amount of each other), or based on the rate of vacuum generation at the vacuum reservoir (such as when the rate is less than a threshold rate). If bypass check valve closing is not confirmed, the routine returns to 210 and maintains the ASOV closed until an indication regarding closing of the bypass check valve is received. If it is confirmed that the bypass check valve is closed, then the routine proceeds to 218 to open the ASOV and draw vacuum at the aspirator. Since the bypass check valve is closed during these conditions, transmission of hissing noise into the vehicle cabin is reduced, improving the operator's drive feel while allowing vacuum to be generated at low cost and high efficiency at the intake aspirator.

In this way, opening of an ASOV responsive to vacuum demand is delayed until closing of a bypass check valve is confirmed.

In one example, an engine system comprises an engine including an intake manifold; an intake compressor; an intake throttle; a bypass intake passage configured to divert intake air from upstream of the compressor to downstream of the throttle via an aspirator; a first solenoid-controlled valve coupled in the bypass intake passage, upstream of the aspirator; and a brake booster coupled to a throat of the aspirator via a first check valve, the brake booster further coupled to the bypass intake passage downstream of the aspirator via a second check valve. The engine system may further include a controller with computer-readable instructions stored in non-transitory memory for: in response to brake booster vacuum demand, maintaining the first valve closed while drawing intake manifold vacuum into the brake booster via the second check valve; and in response to closing of the second check valve, opening the first valve to flow air through the aspirator while drawing aspirator vacuum into the brake booster via the first check valve. The engine system may further comprise a pressure sensor coupled to the intake manifold for estimating a manifold pressure, and a pressure sensor coupled to the brake booster for estimating a brake booster pressure, wherein the closing of the second check valve is inferred based on the estimated manifold pressure relative to the estimated brake booster pressure. Alternatively, the closing of the second check valve may be inferred based on a rate of decrease in the estimated brake booster pressure while the first valve is maintained closed. The controller may include further instructions for decreasing an opening of the intake throttle based on the intake manifold vacuum drawn into the brake booster while the first valve is maintained closed. Likewise, the controller may include instructions for decreasing the opening of the intake throttle based on the aspirator vacuum drawn into the brake booster while the first valve is open.

Figure 3:
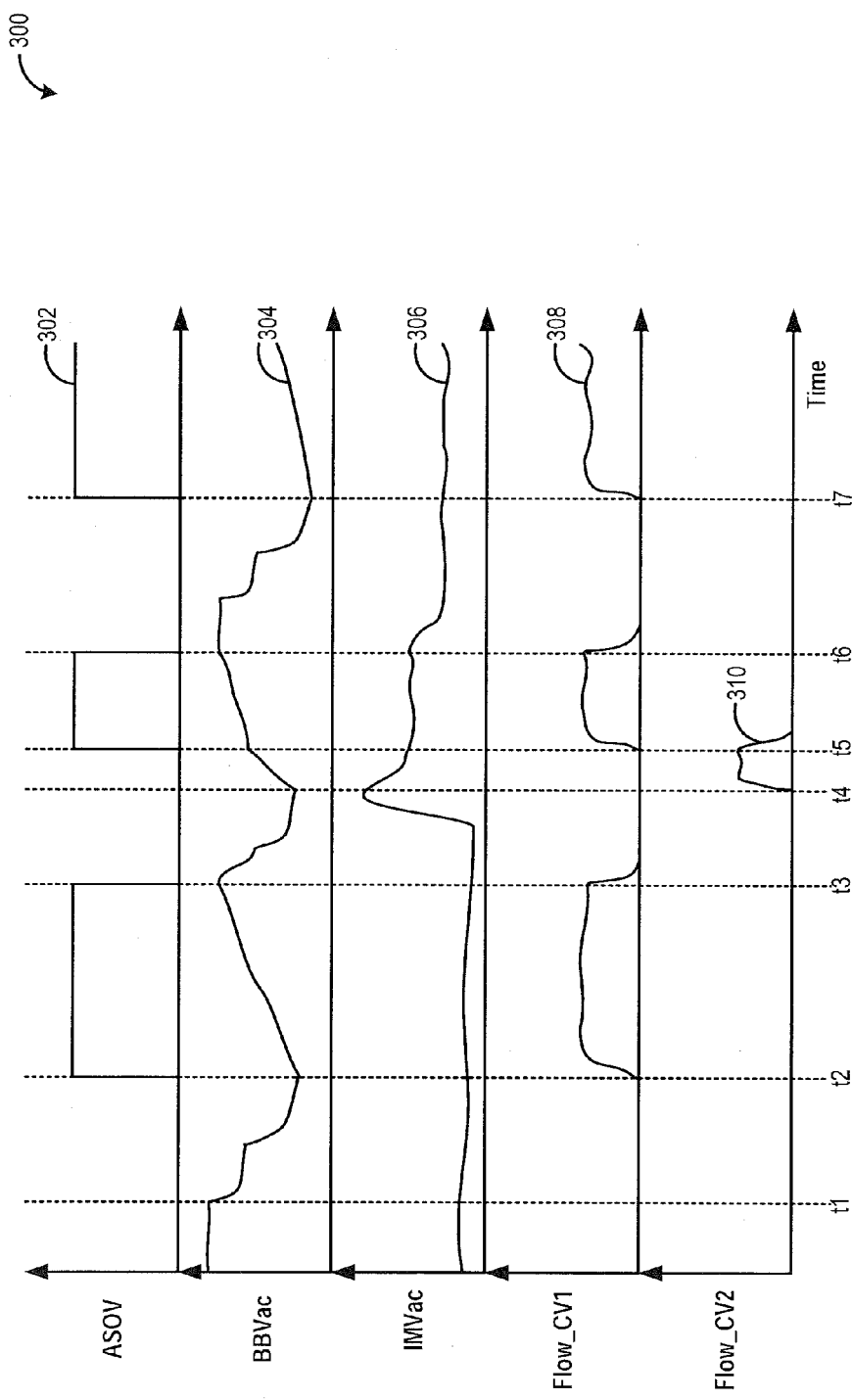
FIG. 3 shows example ASOV adjustments used to reduce a hissing noise in the vehicle cabin.

An example ASOV adjustment is now shown with reference to FIG. 3. In the example of FIG. 3, the vacuum reservoir is coupled to a brake booster. Map 300 depicts the state of an ASOV at plot 302, brake booster vacuum level (BBVac) at plot 304, intake manifold vacuum level (IMVac) at plot 306, flow through a first check valve (Flow_CV1) coupled between an aspirator throat and the brake booster at plot 308, and flow through a second check valve (Flow_CV2) coupled between the intake manifold and the brake booster at plot 310.

Prior to t1, the brake booster vacuum level may be high (plot 304), indicating that there is sufficient vacuum for a brake assist. Since no vacuum generation is required, the ASOV is maintained closed (plot 302). Between t1 and t2, vacuum may be used for brake assist, with a consequent drop in brake booster vacuum level. At t2, it may be determined that vacuum generation is required. Also at (and prior to) t2, intake manifold vacuum levels may be low (plot 306). In one example, the intake manifold vacuum level may be low due to boosted engine operation. Due to the intake manifold vacuum level being lower than the brake booster vacuum level at t2, no vacuum is drawn from the intake manifold into the brake booster, as indicated by no flow through the second check valve (plot 310) coupled between the intake manifold and the brake booster, downstream of an intake aspirator. In other words, it may be inferred that the second check valve is closed. Accordingly, in response to the vacuum demand at t2, the ASOV is opened without delay also at t2.

Between t2 and t3, with the ASOV open, motive flow may be directed through the intake aspirator and vacuum generated at the throat of the aspirator may be drawn into the brake booster via the first check valve coupling the aspirator to the brake booster, as indicated by the presence of flow through the first check valve (plot 308). As a result of aspirator vacuum being drawn, the brake booster vacuum level may rise. At t3, it may be determined that no further vacuum generation is required and the ASOV may close. As a result, no further vacuum is drawn into the brake booster and flow through the first check valve also ceases.

Between t3 and t4, vacuum may be used for brake assist, with a consequent drop in brake booster vacuum level. At t4, it may be determined that vacuum generation is required again. Also between t3 and t4, intake manifold vacuum levels may rise. In one example, the intake manifold vacuum level may rise due to engine operation without boost. Due to the intake manifold vacuum level being higher (or deeper) than the brake booster vacuum level at t4, vacuum is drawn from the intake manifold into the brake booster, as indicated by the presence of flow through the second check valve. In other words, it may be inferred that the second check valve is open (while the first check valve is closed). Accordingly, in response to the vacuum demand at t4, the ASOV opening is delayed. As such, if the ASOV were opened at t4 while the second check valve was open, a hissing noise generated at the aspirator may be transmitted into the vehicle cabin via the second check valve, and the brake booster. The hissing noise may be objectionable to the vehicle operator and may degrade their drive experience. Thus, by keeping the ASPV closed while the second check valve is open, generation and transmission of the objectionable hissing noise is reduced.

The second check valve may remain open until the brake booster vacuum and intake manifold vacuum have sufficiently equilibrated (e.g., are within a threshold amount of each other). For example, the second check valve may remain open from t4 until t5, with flow through open second check valve continuing until t5. At t5, the second check valve may close. However, the vacuum demand may not have been met and further vacuum generation may be required. Thus, at t5, upon confirming that the second check valve is closed, the ASOV is opened to direct motive flow through the aspirator and draw aspirator vacuum into the brake booster. As a result, between t5 and t6, flow may be indicated through the first check valve (and not the second check valve).

At t6, sufficient brake booster vacuum may be stored and the ASOV may be closed. Between t6 and t7, vacuum may be used for brake assist, with a consequent drop in brake booster vacuum level. At t7, it may be determined that vacuum generation is required again. At t7, as at t2, the intake manifold vacuum level may be low, for example, due to boosted engine operation. Thus at t7, as at t2, it may be inferred that the second check valve is closed and the ASOV is opened without delay to generate the demanded vacuum.

In this way, during a first condition, in response to vacuum demand, a controller may open a first valve coupled upstream of an intake aspirator; and during a second condition, in response to vacuum demand, the controller may delay opening the first valve until a second valve coupled downstream of the aspirator is closed. Herein, during the first condition, opening the first valve includes drawing vacuum from a throat of the intake aspirator into a vacuum reservoir, while during the second condition, delaying opening the first valve includes drawing vacuum from an engine intake manifold into the vacuum reservoir when the second valve is open, and drawing vacuum from the throat of the intake aspirator into the vacuum reservoir when the second valve is closed. During the second condition, an indication regarding the closing of the second valve is based on intake manifold vacuum relative to a vacuum level of the vacuum reservoir, the controller indicating that the second valve is closed when the intake manifold vacuum exceeds the vacuum reservoir vacuum level by less than a threshold amount. Alternatively, an indication regarding the closing of the second valve may be based on a rate of vacuum generation at the vacuum reservoir, the controller indicating that the second valve is closed when the rate of vacuum generation at the vacuum reservoir is lower than a threshold while the first valve is closed. The vacuum reservoir may be coupled to a vacuum consumption device, such as a brake booster.

Further, during the first condition, the controller may adjust an intake throttle based on airflow from the aspirator into the engine intake manifold, downstream of the intake throttle, while during the second condition, the controller may adjust the intake throttle based on airflow from the vacuum reservoir into the engine intake manifold while the second valve is open, and further based on airflow from the aspirator into the engine intake manifold when the first valve is open.

In this way, the opening of an ASOV in response to vacuum demand may be adjusted based on the state of a bypass check valve. By delaying opening the ASOV until closure of the check valve is confirmed, the generation and transmission of an objectionable hissing noise into the vehicle cabin is reduced. This allows intake manifold vacuum to be used, when possible. Further, aspirator vacuum may be used to meet engine vacuum demand without degrading a vehicle operator's drive experience.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   with a controller, indicating that a check valve arranged in a passage coupling a vacuum reservoir with an intake manifold is open when an intake manifold vacuum level exceeds a vacuum reservoir vacuum level by more than a threshold amount; and
   responsive to the indication, closing an actively-controlled valve arranged upstream of a motive inlet of an aspirator, a mixed flow outlet of the aspirator coupled with the passage between the check valve and the intake manifold.

2. The method of claim 1, wherein the actively-controlled valve is a solenoid-controlled two port valve, and wherein the check valve is a mechanical valve enforcing uni-directional flow.

3. The method of claim 2, wherein a throat of the aspirator is coupled to the vacuum reservoir, and wherein the vacuum reservoir is coupled to a vacuum consumption device.

4. The method of claim 3, wherein the vacuum consumption device is one or more of a brake booster, a wastegate actuator, a charge motion control valve, and a fuel system canister.

5. The method of claim 4, further comprising, with the controller, indicating that the check valve arranged in the passage coupling the vacuum reservoir with the intake manifold is open when a rate of vacuum generation at the vacuum reservoir is higher than a threshold, the threshold based on a rate of vacuum generation at the aspirator.

6. The method of claim 1, wherein closing the actively-controlled valve includes fully closing the actively-controlled valve.

7. An engine method, comprising:
   with a controller, indicating whether a check valve arranged in a passage coupling a vacuum reservoir with an intake manifold is open or closed based on a difference between an intake manifold vacuum level and a vacuum reservoir vacuum level;
   in response to a vacuum demand, opening an actively-controlled valve coupled upstream of a motive inlet of an intake aspirator if the check valve is closed, a mixed flow outlet of the aspirator coupled with the passage between the check valve and the intake manifold; and
   in response to the vacuum demand, if the check valve is open, delaying opening of the actively-controlled valve until the controller indicates that the check valve is closed.

8. The method of claim 7, wherein opening the actively-controlled valve when the check valve is closed includes drawing vacuum from a throat of the intake aspirator into the vacuum reservoir, and wherein delaying opening of the actively-controlled valve includes drawing vacuum from the intake manifold into the vacuum reservoir when the check valve is open, and drawing vacuum from the throat of the intake aspirator into the vacuum reservoir when the check valve is closed.

9. The method of claim 8, wherein the vacuum reservoir is coupled to a vacuum consumption device, the vacuum consumption device including a brake booster.

10. The method of claim 8, further comprising, responsive to an indication by the controller that the check valve is closed, adjusting an intake throttle based on airflow from the aspirator into the intake manifold, downstream of the intake throttle, and responsive to an indication by the controller that the check valve is open, adjusting the intake throttle based on airflow from the vacuum reservoir into the intake manifold while the check valve is open, and further based on airflow from the aspirator into the intake manifold when the actively-controlled valve is open.

11. The method of claim 7, wherein indicating whether the check valve is open or closed includes indicating that the check valve is closed when the intake manifold vacuum level exceeds the vacuum reservoir vacuum level by less than a threshold amount.

12. The method of claim 7, wherein the indication regarding the closing of the check valve is based on a rate of vacuum generation at the vacuum reservoir.

13. The method of claim 12, wherein indicating whether the check valve is open or closed includes indicating that the check valve is closed when the rate of vacuum generation at the vacuum reservoir is lower than a threshold while the actively-controlled valve is closed.

14. An engine system, comprising:
   an engine including an intake manifold;
   an intake compressor;
   an intake throttle;
   a bypass intake passage configured to divert intake air from upstream of the compressor to downstream of the throttle via an aspirator;
   a first solenoid-controlled valve coupled in the bypass intake passage, upstream of a motive inlet of the aspirator;
   a brake booster vacuum reservoir coupled to a throat of the aspirator via a first check valve, the brake booster vacuum reservoir further coupled to the bypass intake passage downstream of a mixed flow outlet of the aspirator via a second check valve; and
   a controller with computer-readable instructions stored in non-transitory memory for:
      in response to a brake booster vacuum demand,
         indicating whether the second check valve is open or closed based on a difference between an estimated intake manifold pressure and an estimated brake booster vacuum reservoir pressure;
      in response to an indication that the second check valve is open, maintaining the first solenoid-controlled valve closed while drawing fluid from the brake booster vacuum reservoir into the intake manifold via the second check valve; and in response to an indication that the second check valve is closed, opening the first solenoid-controlled valve to flow air through the aspirator while drawing fluid from the brake booster vacuum reservoir into the throat of the aspirator via the first check valve.

15. The system of claim 14, further comprising a pressure sensor coupled to the intake manifold for estimating the intake manifold pressure, and a pressure sensor coupled to the brake booster vacuum reservoir for estimating the brake booster vacuum reservoir pressure.

16. The system of claim 14, further comprising a pressure sensor coupled to the brake booster vacuum reservoir for estimating the brake booster vacuum reservoir pressure, wherein the closing of the second check valve is inferred based on a rate of decrease in the estimated brake booster vacuum reservoir pressure while the first solenoid-controlled valve is maintained closed.

17. The system of claim 14, wherein the controller includes further instructions for decreasing an opening of the intake throttle based on the fluids drawn into the intake manifold from the brake booster vacuum reservoir via the second check valve while the first solenoid-controlled valve is maintained closed.

18. The system of claim 17, wherein the controller includes further instructions for decreasing the opening of the intake throttle based on fluids drawn into the throat of the aspirator from the brake booster vacuum reservoir while the first solenoid-controlled valve is open.

\* \* \* \* \*